United States Patent [19]

Milkovich et al.

[11] 4,307,134

[45] Dec. 22, 1981

[54] PROCESS FOR PRODUCING PLASTICIZED ELASTOMER-STYRENE COATED BEADS

[75] Inventors: Ralph Milkovich, Paoli; David R. Warfel, Exton; Elizabeth A. Blommers, Newtown Square; Alvin R. Ingram, West Chester, all of Pa.

[73] Assignee: Atlantic Richfield Company, Los Angeles, Calif.

[21] Appl. No.: 219,066

[22] Filed: Dec. 22, 1980

[51] Int. Cl.$^3$ .............................................. C12P 33/14
[52] U.S. Cl. ...................................... 427/222; 521/57
[58] Field of Search .......................... 521/57; 427/222

[56] References Cited

U.S. PATENT DOCUMENTS

| | | | |
|---|---|---|---|
| 3,102,050 | 8/1963 | Canterino | 427/222 |
| 3,185,588 | 5/1965 | Resnick | 427/222 |
| 3,370,022 | 2/1968 | Ingram | 521/57 |

FOREIGN PATENT DOCUMENTS

| | | | |
|---|---|---|---|
| 2413419 | 8/1979 | France | 521/57 |
| 2413420 | 8/1979 | France | 521/57 |
| 402269 | 7/1962 | Japan | 521/57 |
| 1025694 | 4/1966 | United Kingdom | 427/222 |

*Primary Examiner*—Sam Silverberg
*Attorney, Agent, or Firm*—Lewis J. Young

[57] ABSTRACT

Polymeric beads for use in forming soft molded articles of low density are produced by formation of a plasticized elastomer-styrene polymeric coating about initial styrene beads, by forming an aqueous suspension of the initial beads, adding thereto an aqueous emulsion of a coating composition consisting of styrenic monomer, a conjugated diene elastomer, and a plasticizer, containing a catalyst and a nonionic surfactant comprising an ethylene oxide condensate of an alkylphenol, the surfactant containing at least thirty moles of ethylene oxide per mole of alkylphenol, and polymerizing the coating composition about the initial beads.

12 Claims, No Drawings

PROCESS FOR PRODUCING PLASTICIZED ELASTOMER-STYRENE COATED BEADS

RELATED INVENTION

Reference is made to the application of R. Milkovich, D. R. Warfel and A. R. Ingram, Ser. No. 219,068, filed Dec. 22, 1980, entitled "Process for Producing Styrenic Polymer Beads Coated With Polymerizates Of Styrene and Elastomers", the contents of which is incorporated by reference herein.

BACKGROUND OF THE INVENTION

This invention relates to a process for forming styrenic polymer beads for producing soft molded products such as packaging material.

The formation of styrene polymer beads is a well known and commercial process. One such process is described in Grim patent U.S. Pat. No. 2,673,194, the contents of which are incorporated by reference herein. Such styrene polymer beads, upon impregnation with a blowing agent, are expanded in a continuous upward flow of steam to yield discrete pieces of foam. Then, after an aging period of several hours during which air diffuses into the expanded particles, they are placed in a slightly vented mold. The particles are then heated with steam at superatmospheric pressure injected into the mold so that they expand to fill the empty spaces and fuse together. The molding operation is completed by circulating or spraying cold water in the jacket of the mold until the foam no longer exerts pressure.

A useful property of expanded polystyrene articles is the cushioning effect that such articles provide when used as a packaging material. Attempts have been made to increase, even more, the cushioning properties of polystyrene articles, by enhancing the impact strength and resiliency of the expanded polystyrene used to form such articles. Such attempts include the polymerization of styrene (60–70 parts) after its absorption into particles (40–30 parts) of copolymerized ethylene and vinyl acetate. These particles, after impregnation with butane, yield molded foams that are softer, more resilient and have greater resistance to impact than polystyrene foams. However, because of the fugitivity of the blowing agent, the product must be expanded promptly after its production or stored in pressure-resistant containers at low temperatures.

Polyethylene foams of approximately two pounds per cubic foot density exhibit goods impact strength and resiliency but are deficient for some packaging applications because of a tendency to creep and form on enlarged cavity while bearing a relatively light load.

An object of the present invention is to provide expandable styrenic polymer beads with enhanced expandability, shelf life comparable to conventional expandable polystyrene, and utility for forming soft molded articles of low density.

SUMMARY OF THE INVENTION

Coated styrenic polymer beads for use in producing soft foamed articles are produced by forming a suspension of styrenic polymer beads in an aqueous medium and adding thereto, under polymerization conditions, an emulsion which contains a major portion of a styrenic monomer and a minor portion of a coating composition which is a mixture of a diene elastomer and a plasticizer, such as a mineral oil, therefor, the emulsion formed in an aqueous medium containing a condensate of an alkylphenol with at least thirty moles of ethylene oxide per mole of alkylphenol, the mixture so formed maintained at an elevated temperature so as to form a polymerized coating about the initial styrene styrenic beads.

DETAILED DESCRIPTION

The present invention provides for the formation of a coating of a polymerizate of styrene and a plasticized conjugated diene elastomer about styrenic polymer beads to produce beads which, upon impregnation with a blowing or expansion agent and expansion thereof, can be used for the molding of soft expanded polymeric articles.

The term "styrenic" as used herein is intended to include styrene, alpha-methylstyrene, para-methylstyrene, para-t-butylstyrene, monochlorostyrene and dichlorostyrene, as well as mixtures thereof, when used in conjunction with styrenic polymer beads or styrenic monomer. The formation of initial such styrenic polymer beads is according to known processes and the present invention is directed to a process for forming a coating about such beads to provide coated beads which form soft articles.

These initial styrenic polymer beads are formed into a suspension in an aqueous medium by dispersing the beads in water, containing a finely divided, difficultly water-soluble inorganic phosphate suspending agent such as those described in Grim U.S. Pat. No. 2,673,194, and include tricalcium phosphate, hydroxyapatite, magnesium phosphate, and the like. In addition to the finely divided difficultly water-soluble inorganic phosphate suspending agent, there is added, as is conventional, a modifier therefor also as described in the Grim patent, such as sodium dodecylbenzene sulfonate.

An emulsion is formed containing a coating composition which consists of a major amount of a styrenic monomer and a minor amount of a conjugated diene elastomer and a plasticizer therefor. The conjugated diene elastomers are selected from homopolymers of conjugated dienes, such as butadiene, isoprene, 2,3-dimethylbutadiene, chloroprene and piperylene, or diene block copolymer rubbers. The preferred dienes are butadiene and isoprene.

The diene block copolymer rubbers are block copolymers of vinyl aromatic compounds and conjugated dienes, which dienes will have average molecular weights greater than the molecular weight of the combined blocks of vinyl aromatic compounds.

These block copolymers will generally contain 2–50% by weight vinyl aromatic compound and 50–98% by weight conjugated diene. More preferably, the vinyl content will be 10–40% with the diene content of 60–90%. The vinyl aromatic compounds may be styrene, alpha-methylstyrene, nuclear methylstyrenes, dichlorostyrenes and vinyl naphthalene and the like. The preferred compound is styrene.

Suitable block copolymer rubbers are the graded block, A-B diblock, the radial or star block, A-B-A triblock, and the A-B-A hydrogenated triblock rubbers.

All of the block copolymer rubbers can be made by known processes involving anionic initiators such as butyl lithium.

Graded diblock rubbers are those A-B type block copolymers in which each A block is essentially polymerized vinyl aromatic monomer with a minor amount of a conjugated diene, and each B block is essentially a conjugated diene polymer with a minor amount of vinyl aromatic monomer. Such graded block rubbers may be prepared by polymerizing a mixture of the vinyl aromatic monomer and the diene in a neutral solvent, such as n-hexane, using a sec-butyl lithium catalyst. In this type of system, the initial polymer chains are predominantly polydiene, but as the diene is depleted the later polymer formed is predominantly polyvinyl aromatic monomer. Such copolymer rubbers are also available commercially, as for instance Stereon 720, a Firestone Synthetic Rubber & Latex Company product having 90% by weight butadiene and 10% by weight styrene with 55% by weight of the styrene appearing as polystyrene blocks.

Diblock copolymer rubbers are copolymers of A-B type wherein A represents a block of poly(vinyl aromatic monomer) and B represents a block of poly (conjugated diene). True diblock copolymer rubbers are made by polymerizing one of the monomers to essential completion and then adding the second monomer. Thus, butadiene may be anionically polymerized using sec-butyl lithium catalyst. Then, prior to termination of the polymer chains, the styrene is added and polymerization allowed to continue. Diblock copolymers may also be prepared by separately polymerizing each monomer in the presence of a lithium catalyst and then combining the separate blocks by reacting the lithium terminated blocks together in the presence of a difunctional coupling agent. Such diblock rubbers are also available commercially, as for instance Solprene 1205, a Phillips Petroleum Company product having 75% by weight polybutadiene and 25% by weight polystyrene.

Radial or star block copolymer rubbers are branched copolymers having at least three A-B diblock chains connected to a central nucleus. Thus, chains of block copolymers prepared by polymerizing vinyl aromatic monomers and conjugated diene monomers in inert solvents using organo-lithium catalysts can be added, while still lithium terminated, to compounds having at least three functional sites capable of reacting with the lithium to carbon bond and adding to the carbon possessing this bond in the copolymer. Such polyfunctional compounds are, for example, polyepoxides, polyisocyanates, polyimines, polyaldehydes, polyketones, polyanhydrides, polyesters, etc. Such radial block rubbers are also available commercially, as for instance Solprene 414P, a product of Phillips Petroleum Company having 60% by weight polybutadiene and 40% by weight polystyrene.

Triblock copolymers of the A-B-A or B-A-B type, wherein, again A represents a block of poly (vinyl aromatic monomer) and B represents a block of poly (conjugated diene). Such triblock copolymers can be prepared by sequential addition of the desired monomers into a lithium alkyl initiated polymerization. Another effective method would be to polymerize the diene monomer, for example, in the presence of a difunctional catalyst, such as dilithiostilbene, and then adding the vinyl aryl monomer to form the end blocks. Such triblock copolymer rubbers are also available commercially as, for example, Kraton 1107, a product of Shell Chemical Company being a polystyrene-polyisoprene-polystyrene triblock rubber having 86% by weight polyisoprene and 14% by weight polystyrene.

Also suitable are the hydrogenated triblock copolymer rubbers formed by, for example, selective hydrogenation of A-B-A triblock type copolymers. Especially suitable are the hydrogenated triblock copolymer rubbers wherein the hydrogenation has been primarily in the polydiene blocks, B. Thus, U.S. Pat. No. 3,595,942 describes the polymers and suitable methods for their hydrogenation such that at least 80% of the aliphatic unsaturation has been reduced by hydrogenation and less than 25% of the aromatic unsaturation of the vinyl aromatic monomer blocks, A, have been hydrogenated. Such copolymers are available commercially as, for example, Kraton G, a product of Shell Chemical Company, being a polystyrene-polyisoprene-polystyrene triblock rubber wherein the polyisoprene portion has been hydrogenated to a poly(ethylene/propylene) copolymer block.

In addition to the conjugated diene elastomer, a plasticizer is added to the coating composition. Such plasticizers include oils, such as a mineral oil, or other plasticizing compounds such as alkyl adipates, including dioctyl adipate, diisobutyl adipate, and the like. Also, the presence of unpolymerized styrene in the coating of the beads produced has been found to act as a plasticizer therefor. The plasticizer is one which is soluble in the styrenic monomer, has a melting point of less than about 35° C. and a boiling point greater than about 140° C.

The emulsion of styrenic monomer, conjugated diene elastomer and plasticizer is formed in an aqueous medium and also contains a styrenic monomer catalyst and a nonionic surfactant. The catalyst forming a part of the emulsion comprises a free-radical-initiating catalyst which is soluble in the styrenic monomer, such as the known peroxides, benzoyl peroxide and t-butyl perbenzoate, in conventional amounts.

The styrenic monomer, conjugated diene elastomer, plasticizer, and monomer-soluble catalyst are emulsified in an aqueous medium by the use of specific nonionic surfactants. The nonionic surfactants usable in the present process are ethylene oxide condensates of an octyl or nonylphenol, and the nonionic surfactant must contain at least 30 moles of ethylene oxide per mole of said alkylphenol. A particular useful nonionic surfactant is a polyoxyethylene (50) ether of nonylphenol sold under the name of Igepal CO-970. Use of other surfactants, either nonionic or other, or even the use of polyoxyethylene nonylphenol surfactants having less than about thirty moles of ethylene oxide per mole of nonylphenol have been found to give complete or partial agglomeration of the beads and/or formation of an excessive amount of powder-like polymer finer than the openings of a 100-mesh sieve.

The particular surfactants are added to the catalyst-styrene-conjugated diene elastomer-water mixture in an amount of 0.1 to 1.0 weight percent, based upon the amount of water in the emulsion to be formed, with about 0.5 percent by weight preferred.

The amount of styrenic monomer, conjugated diene elastomer, and plasticizer present in the emulsion will depend upon the amount of the coating to be formed about the initial styrenic polymer beads but should be such that the final beads produced comprise 50-98 percent by weight the initial styrenic beads and 2-50 percent by weight of the coating. The coating itself should be formed from a mixture of a major portion of styrenic monomer and a minor portion of conjugated elastomer and plasticizer such that the coating also comprises from 75-98 percent by weight of styrenic monomer and 2-25 percent by weight of plasticized conjugated diene elastomer, and the plasticizer content is 2 percent by weight or less of the weight of the coated beads.

The aqueous emulsion of styrenic monomer elastomer and plasticizer containing a free radical catalyst and the specified nonionic surfactant, may be formed as an emulsion in a single vessel and added therefrom to the aqueous suspension of styrenic polymer beads.

The aqueous emulsion of styrenic monomer elastomer, plasticizer and catalyst, containing the nonionic surfactant, is added to the aqueous suspension of styrenic polymer beads, over a period of about one hour, with the suspension maintained at an elevated temperature, such as about 90° C., with stirring. The suspension is then further heated, with stirring, at about 90° C. for a sufficient time period, such as about three to six hours, so as to effect polymerization of the monomers about the beads. The time of addition, temperature, and time of additional heating to effect polymerization may be varied, dependent upon the amount and type of styrenic monomer used and the thickness and hardness of the coating desired about the styrenic beads. For example, when styrene or some other polymerizable compound is to be used as the plasticizer, the time and temperature may be reduced such that unpolymerized monomer will remain in the coating.

The beads, so produced, are then impregnated with an expanding agent such as a gas or an agent which will produce a gas on heating, such as aliphatic hydrocarbons containing from 4 to 6 carbon atoms in the molecule, such as butane, pentane, cyclopentane, hexane, cyclohexane and those halogenated hydrocarbons which boil at a temperature below the softening point of the polymer. The expanding agents, which are conventional, may be incorporated by conventional processes, for example, that described in U.S. Pat. No. 2,983,692.

The present invention is further illustrated in the following examples, wherein parts and percentages are parts and percentages by weight unless otherwise indicated.

EXAMPLE I

In this example, initial polystyrene beads had a 10% by weight coating formed thereon, the coating consisting of polymerizate of 85 percent by weight of polystyrene and 15 percent by weight of a plasticized elastomer.

To a 2-liter resin kettle having a hot air bath surrounding the same, an agitator, an air reflux condensor, two combination thermowell baffles and a monomer emulsion feed port in the dome of the kettle, there was added 445 ml of distilled water, 1.0 g of tricalcium phosphate, 5 ml of a 1.0% aqueous solution of sodium dodecylbenzene sulfonate (Ultrawet K), and 450 g of polystyrene beads (approx. 210,000 wt. avg. molecular weight) screened through a 16-mesh sieve and retained on a 30-mesh sieve. The slurry so produced was heated to 70° C. and during 2 minutes there was added 20 g of an emulsion of dyed styrene [25-g styrene containing 0.05% of Perox Violet 3B, an oil soluble violet dye which does not affect polymerization, with 25 ml of 1.5% Igepal CO-970 (polyoxyethylene (50) ether of nonylphenol)], and stirring was continued for ten minutes. The dyed styrene permitted observation of the uniformity of distribution of monomer. Over two minutes at 70° C. there was then added 20 g of an emulsion containing styrene, a styrene-butadiene-styrene block copolymer elastomer (Kraton 1102: 72% butadiene-28% styrene), a plasticizer (ARCO Tufflo Oil No. 6054, a mineral oil), and catalyst [25 g of a solution (21.3 g of dyed styrene, 1.85 g of elastomer, 1.85 g of plasticizer, 0.438 g benzoyl peroxide and 0.063 g of t-butyl perbenzoate) mixed with 25 ml of 0.5% aqueous Igepal CO-970]. The mixture was stirred for 1.25 hr at 70° C. There was then added 60 g of an emulsion containing uncatalyzed styrene, the elastomer, and the plasticizer [a solution of 4.0 g of the elastomer and 4.0 g of the plasticizer dissolved in 32.0 g of dyed styrene) mixed with 40 ml of 0.5% Igepal CO-970], over a period of one hour while heating from 70° to 90°. The mixture was stirred an additional 4 hours at 90° C. to harden the beads. The slurry was then transferred to a series of 12 oz. (crown cap) bottles and heated 2 hours at 115° C. followed by 2 hours at 135° C. The bead slurry was acidified to dissolve tricalcium phosphate, washed well with water, and air dried.

The beads were impregnated with n-pentane by charging to each of a series of 12 oz crown cap bottles, 100 g of coated beads, 3.0 g tricalcium phosphate, 0.03 g Ultrawet-K (1% aqueous solution), 100 g of distilled water and 8.5 g of n-pentane. The bottles were capped and heated for three hours at 115° C. The bottles were then cooled to room temperature, opened, the contents acidified with hydrochloric acid, and the beads separated by centrifuging, and air dried.

A control was provided for comparison purposes, comprising uncoated polystyrene beads impregnated with n-pentane in the same manner as above.

The beads were expanded for 2 minutes in steam at atmospheric pressure, aged overnight and then molded into cylinders 8 inches in diameter and 2 inches in thickness. Table I depicts the evaluation of the expansion, compression and creep characteristics of the coated and uncoated bead products.

TABLE I

| Styrene/Plasticizer & Elastomer (%) | Coating (%) | Foam Density (lb./ft.$^3$) | Compression[1] | | Compressive Set (%) | Creep (%)[2] | | |
|---|---|---|---|---|---|---|---|---|
| | | | Modulus (lb./in.$^2$) | Compressive Failure (lb./in.$^2$) | | 1 Day | 5 Days | 12 Days |
| None | None | 1.19 | 412 | 20 | 15 | 1.5 | 1.7 | 1.7 |
| 85/7.5 + 7.5 | 10 | 0.96 | 207 | 14 | 9.2 | 1.1 | 2.0 | 1.5 |

[1] 30% deflection. Compressive set was measured after recovery for 24 hours.
[2] % decrease in thickness of a 2in. × 2in. × 2in. specimen under load of 2 lb./in.$^2$

EXAMPLE II

To illustrate the use of a different plasticizer, Example I was repeated, except that dioctyl adipate was substituted for the Tufflo Oil 6054. Also, all of the plasticizer was added as part of the emulsion added over the one hour period while heating from 70° to 90° C. The expansion, compression and creep characteristics of foams prepared from the beads so produced are listed in Table II:

TABLE II[(1)]

| Styrene/Plasticizer & Elastomer (%) | Coating (%) | Foam Density (lb/ft$^3$) | Compression | | | Creep (%) | | |
|---|---|---|---|---|---|---|---|---|
| | | | Modulus (lb/in$^2$) | Compressive Failure (lb/in$^2$) | Set (%) | 1 Day | 5 Days | 12 Days |
| 85/7.5 + 7.5 | 10 | 0.76 | 146 | 13 | 7.8 | 1.3 | 2.2 | 2.6 |

[(1)]See footnote to Table I.

These beads exhibited excellent expandability, i.e. to 0.76 lb/ft$^3$ in two minutes. The molded foams were soft and resilient. In spite of their low density, the foams were dimensionally stable and had good creep resistance.

EXAMPLE III

In this example, unpolymerized styrene monomer was retained in the elastomer-styrene coating to act as a plasticizer. Two runs, A and B, were made according to the procedure of Example I, wherein a 10% coating of a styrene-elastomer composition (90% styrene-10% elastomer) was formed about polystyrene beads. The elastomer used was Kraton 2103 (a styrene-ethylene-butylene-styrene block copolymer: 29% styrene-71% rubber, containing about 2% butylated p-hydroxytoluene as stabilizer) sold by Shell Chemical Company. In Run A, the mixture, after addition of the styrene-elastomer emulsion, and after a 4 hour period at 90° C., was heated for 2 hours at 115° C. followed by 2 hours at 135° C.; while in Run B, the mixture was heated for 3 hours at 115° C. and only 1 hour at 135° C. The volatile content of the unimpregnated beads from Run A was 0.22%, while the volatile content of unimpregnated beads from Run B was 0.92%, indicating unpolymerized styrene present in the bead coating. Results of testing of products from the two runs are listed in Table III:

TABLE III[1]

| Run | Non-Polymerized Residue (%) | Foam Density (lb./ft.$^3$) | Compression | | | Creep (%) | | |
|---|---|---|---|---|---|---|---|---|
| | | | Modulus (lb./in.$^2$) | Compressive Failure (lb./in.$^2$) | Set (%) | 1 Day | 5 Days | 12 Days |
| A | 0.22 | 1.11 | 257 | 16 | 9.6 | 0 | 0.6 | 0.7 |
| B | 0.92 | 0.69 | 91 | 10 | 9.5 | 6.7 | 8.7 | N.D. |

[1]See footnotes to Table I.

Like the beads of Example II, the product, with 0.92% volatiles prior to impregnation, had exceptional expandability (to 0.69 lb/ft$^3$ in 2 minutes) and softness. In spite of their low density, the foams retained the dimensions of the mold. However, the high creep values indicate that these foams would be useful for packaging of only very light weight objects.

We claim:

1. A process for forming coated styrenic polymer beads for use in producing low density soft foamed articles comprising:

(a) forming an aqueous suspension of initial styrenic polymer beads with the aid of a finely divided, difficultly water-soluble, inorganic phosphate suspending agent and a modifier therefor, (b) forming an emulsion containing a plasticized coating composition consisting of a major amount of a styrenic monomer, a minor amount of a conjugated diene elastomer, and a minor amount of a plasticizer therefor, and containing a styrenic-monomer-soluble free-radical-producing catalyst, in an aqueous medium containing a nonionic surfactant comprising an ethylene oxide condensate of an alkylphenol, selected from octylphenols and nonylphenols, said surfactant containing at least thrity moles of ethylene oxide per mole of alkylphenol;

(c) adding said emulsion to said styrenic polymer bead suspension to form a mixture thereof, while maintaining the suspension at an elevated temperature; and maintaining the mixture so formed at an elevated temperature to cause said coating composition to polymerize and form a coating about said initial styrenic polymer beads.

2. The process as defined in claim 1 wherein said conjugated diene elastomer is selected from homopolymers of conjugated dienes and diene block copolymer rubbers.

3. The process of claim 2 wherein said conjugated diene block copolymer rubber is selected from the group consisting of graded block, A-B diblock, radial or star block, A-B-A triblock and A-B-A hydrogenated triblock rubbers, wherein A represents essentially polymerized vinyl aromatic monomer with a minor amount of conjugated diene, B represents essentially conjugated diene polymer with a minor amount of vinyl aromatic monomer, and the rubbers contain from 2 to 50% by weight vinyl aromatic monomer and 50 to 98% by weight of conjugated diene.

4. The process of claims 1, 2 or 3 wherein the diene in the conjugated diene elastomer is selected from the group consisting of butadiene, isoprene, choloroprene, 2, 3-dimethylbutadiene and piperylene.

5. The process as defined in claim 1 wherein said initial styrenic polymer beads are produced from a styrenic monomer selected from the group consisting of styrene, alpha-methylstyrene, para-methylstyrene, para-t-butylstyrene, monochlorostyrene and dichlorostyrene.

6. The process as defined in claim 1 wherein said styrenic monomer is selected from the group consisting of styrene, alpha-methylstyrene, para-methylstyrene, para-t-butylstyrene, monochlorostyrene and dichlorostyrene.

7. The process as defined in claim 1 wherein the coating formed about said initial beads comprises 2-50 percent by weight of the beads so produced.

8. The process as defined in claim 1 wherein the coating formed about said beads comprises from 75-98 percent by weight of said styrenic monomer and 2-25 percent by weight of said plasticizer and conjugated diene elastomer.

9. The process as defined in claim 1 wherein said plasticizer is soluble in the styrenic monomer, has a melting point of less than 35° C. and a boiling point greater than 140° C., and is present in an amount of two percent or less by weight, based upon the weight of the coated beads.

10. The process as defined in claim 1 wherein said plasticizer is mineral oil.

11. The process as defined in claim 1 wherein said plasticizer is dioctyl adipate.

12. The process as defined in claim 1 wherein said styrenic monomer is styrene, said plasticizer comprises styrene monomer, and wherein said styrene monomer is only partially polymerized during the polymerization of said coating composition.

* * * * *